（12）United States Patent
Wang et al.

(10) Patent No.: US 9,003,904 B2
(45) Date of Patent: Apr. 14, 2015

(54) TRANSMISSION ASSEMBLY FOR A VEHICLE

(71) Applicant: Kwang Yang Motor Co., Ltd., Kaohsiung (TW)

(72) Inventors: Chun-Kai Wang, Tainan (TW); Chao-Chang Ho, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 14 days.

(21) Appl. No.: 14/031,409

(22) Filed: Sep. 19, 2013

(65) Prior Publication Data

US 2014/0083219 A1    Mar. 27, 2014

(30) Foreign Application Priority Data

Sep. 26, 2012    (TW) .............................. 101135339 A

(51) Int. Cl.
| | |
|---|---|
| *F16H 3/08* | (2006.01) |
| *F16H 57/00* | (2012.01) |
| *F16H 1/06* | (2006.01) |
| *F16H 57/04* | (2010.01) |
| *F16D 23/12* | (2006.01) |

(52) U.S. Cl.
CPC ............... *F16H 1/06* (2013.01); *F16H 57/043* (2013.01); *Y10T 74/19614* (2015.01); *F16D 23/12* (2013.01)

(58) Field of Classification Search
USPC ................ 74/325, 405, 15.63, 435; 184/6.12; 192/84.6, 84.7, 84.92, 69.4, 69.42; 180/53.8
See application file for complete search history.

(56) References Cited

U.S. PATENT DOCUMENTS

| | | | | |
|---|---|---|---|---|
| 3,332,303 | A * | 7/1967 | Daugherty ..................... | 192/138 |
| 4,950,214 | A * | 8/1990 | Botterill ......................... | 475/231 |
| 5,080,640 | A * | 1/1992 | Botterill ......................... | 475/231 |
| 6,561,939 | B1 * | 5/2003 | Knapke ......................... | 475/150 |
| 6,808,037 | B1 * | 10/2004 | Mueller ........................ | 180/247 |
| 2012/0175887 | A1 * | 7/2012 | Chang et al. .................. | 290/1 R |

* cited by examiner

*Primary Examiner* — William Kelleher
*Assistant Examiner* — Jake Cook
(74) *Attorney, Agent, or Firm* — Whyte Hirschboeck Dudek SC

(57) ABSTRACT

A transmission assembly for a vehicle includes a transmission mechanism, a clutch unit and a switching mechanism. The transmission mechanism includes first and second gears meshing with each other. The clutch unit is slidable along a crankshaft rotation axis between an engaging position, in which the clutch unit engages the first gear, and a disengaging position, in which the clutch unit is disengaged from the first gear. The switching mechanism includes a motor, and a clutch-driving member that is driven by the motor to move relative to the transmission mechanism and the clutch unit and to drive sliding movement of the clutch unit from the disengaging position to the engaging position.

6 Claims, 5 Drawing Sheets

TRANSMISSION ASSEMBLY FOR A VEHICLE

CROSS-REFERENCE TO RELATED APPLICATION

This application claims priority of Taiwanese Application No. 101135339, filed on Sep. 26, 2012.

BACKGROUND OF THE INVENTION

1. Field of the Invention

This invention relates to a transmission assembly for a vehicle, more particularly to a transmission assembly having an electric driven switching mechanism for controlling operation of a current-supplying generator.

2. Description of the Related Art

Referring to FIG. 1, Taiwanese Patent Publication No. 201203812 discloses a conventional transmission assembly 12 for a vehicle 100. The vehicle 100 includes an engine housing 101, a crankshaft 102 mounted rotatably in the engine housing 101, a battery charging generator 103 co-rotatably coupled to the crankshaft 102, a manually operative switching mechanism 11, and a current-supplying generator 104. The transmission assembly 12 includes a transmission shaft 122 that is co-rotatably coupled to a shaft 106 of the current-supplying generator 104, a driving gear 112 that is sleeved around the crankshaft 102, and a driven gear 121 that meshes with the driving gear 112 and that is co-axially and securely sleeved on the transmission shaft 122. The switching mechanism 11 includes: a clutch member 111 that is co-rotatably coupled to the crankshaft 102, that is operatively movable relative to the crankshaft 102 to engage and disengage the driving gear 112, and that has a driven protrusion 116; a switching shaft 114 that is mounted rotatably to the engine housing 101 and that is rotatable between a first angular position (not shown) and a second angular position; and a handle 115 for manually driving rotation of the switching shaft 114 between the first and second angular positions. When the switching shaft 114 is rotated from the first angular position to the second angular position, the switching shaft 114 is brought into contact with and pushes the driven protrusion 116 of the clutch member 111, resulting in movement of the clutch member 111 toward the driving gear 112 and engagement between the clutch member 111 and the driving gear 112. As a consequence, a rotational power of the crankshaft 102 can be transmitted to the shaft 106 of the current-supplying generator 104 through the driving gear 112, the driven gear 121 and the transmission shaft 122, thereby permitting generation of electric power by the current-supplying generator 104.

Since rotation of the switching shaft 114 is manually operated by the user, and since undesired collision between the clutch member 111 and the driving gear 112 tends to occur when the switching shaft 114 is rotated to bring into engagement and disengagement between the clutch member 111 and the driving gear 112 and when the clutch member 111 is co-rotated with the crankshaft 102, significant safety concerns arise.

SUMMARY OF THE INVENTION

Therefore, an object of the present invention is to provide a transmission assembly for a vehicle that can overcome the aforesaid drawback associated with the prior art.

According to this invention, there is provided a transmission assembly for a vehicle including a support, a crankshaft defining a crankshaft rotation axis, and a current-supplying generator with a generator shaft. The transmission assembly comprises a transmission mechanism, a clutch unit, and a switching mechanism.

The transmission mechanism is adapted to be mounted to the support, and includes first and second gears. The first gear being is adapted to be coaxially sleeved around the crankshaft in a manner that the crankshaft is rotatable relative to the first gear. The second gear meshes with the first gear, and is adapted to be co-rotatably coupled to the generator shaft.

The clutch unit is adapted to be co-rotatably coupled to the crankshaft, and to be slidable along the crankshaft rotation axis between an engaging position, in which the clutch unit engages the first gear so as to permit transmission of a rotational power of the crankshaft to the generator shaft through the first and second gears, and a disengaging position, in which the clutch unit is disengaged from the first gear.

The switching mechanism includes a motor, and a clutch-driving member that is driven by the motor to move relative to the transmission mechanism and the clutch unit and to drive sliding movement of the clutch unit from the disengaging position to the engaging position.

BRIEF DESCRIPTION OF THE DRAWINGS

In drawings which illustrate an embodiment of the invention.

DETAILED DESCRIPTION OF THE PREFERRED EMBODIMENT

Figure 1:
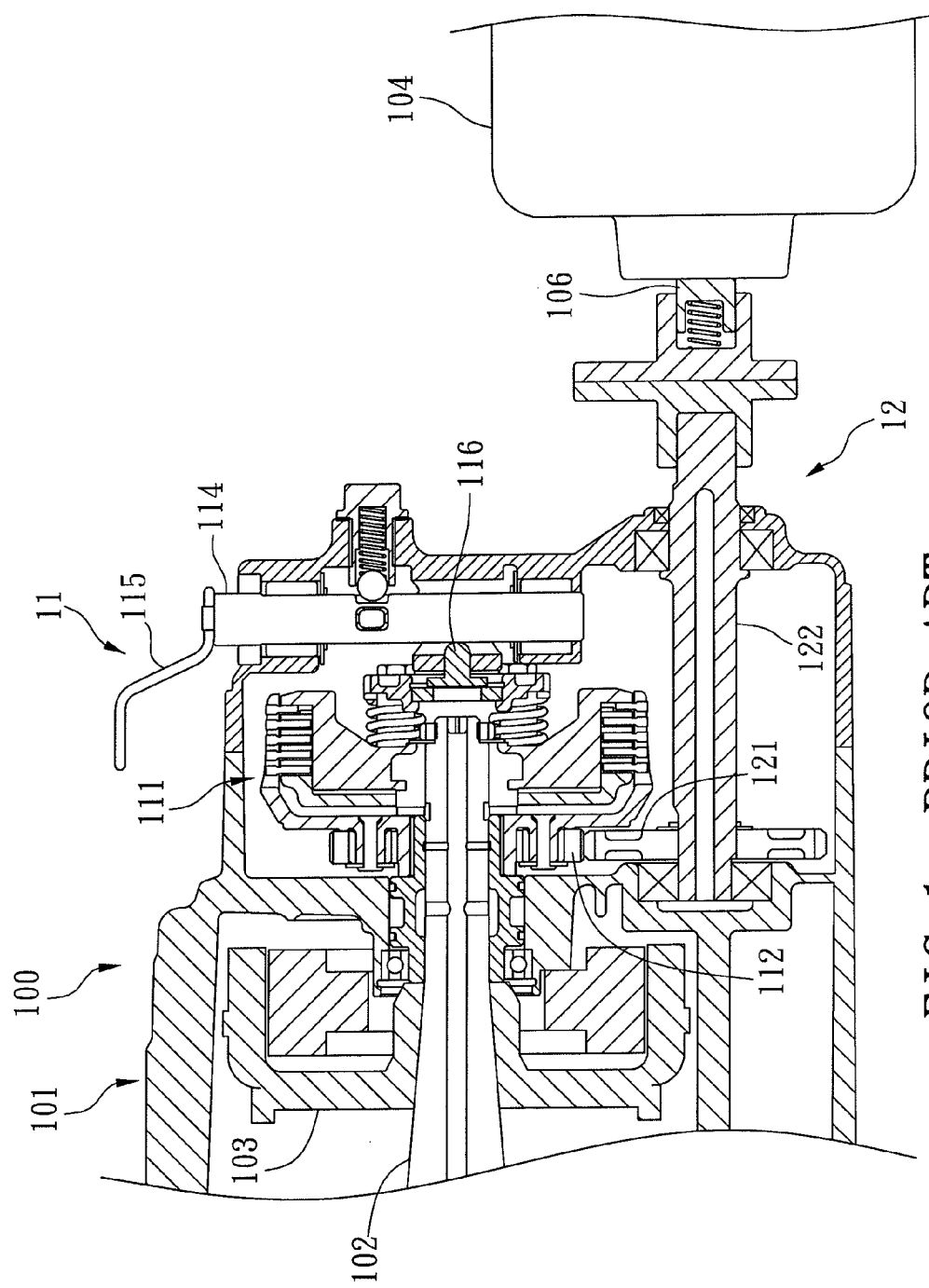
FIG. 1 is a fragmentary sectional view of a conventional transmission assembly for a vehicle.

FIGS. 2 to 5 illustrate the preferred embodiment of a transmission assembly for a vehicle according to the present invention. The vehicle includes a support 201, a crankshaft 202 that is supported on the support 201 and that defines a crankshaft rotation axis (X), a battery-charging generator 203 co-rotatably coupled to the crankshaft 202, and a current-supplying generator 204 with a generator shaft 205 that defines a generator rotation axis which is parallel to the crankshaft rotation axis (X). The current-supplying generator 204 is operatively associated with the crankshaft 202 to generate a current for operation of external electronic devices, illuminating devices, or electric appliances. In this embodiment, the support 201 is an engine housing. Alternatively, the support 201 can be a mounting means formed or provided on the engine housing.

The transmission assembly includes a transmission mechanism 3, a clutch unit 5, an electric driven switching mechanism 6, a position indicator 64, and a lubricating unit 20.

The transmission mechanism 3 is mounted to the support 201 and includes first and second gears 31, 33, a transmission coupler 32, a restoring urging member 54 and an annular restricting plate 34. The first gear 31 is formed with a first inter-engaging element 311, and is coaxially sleeved around the crankshaft 202 in a manner that the crankshaft 202 is rotatable relative to the first gear 31 about the crankshaft rotation axis (X). The second gear 33 meshes with the first gear 31 and is co-rotatably coupled to the generator shaft 205 through the transmission coupler 32.

Figure 2:
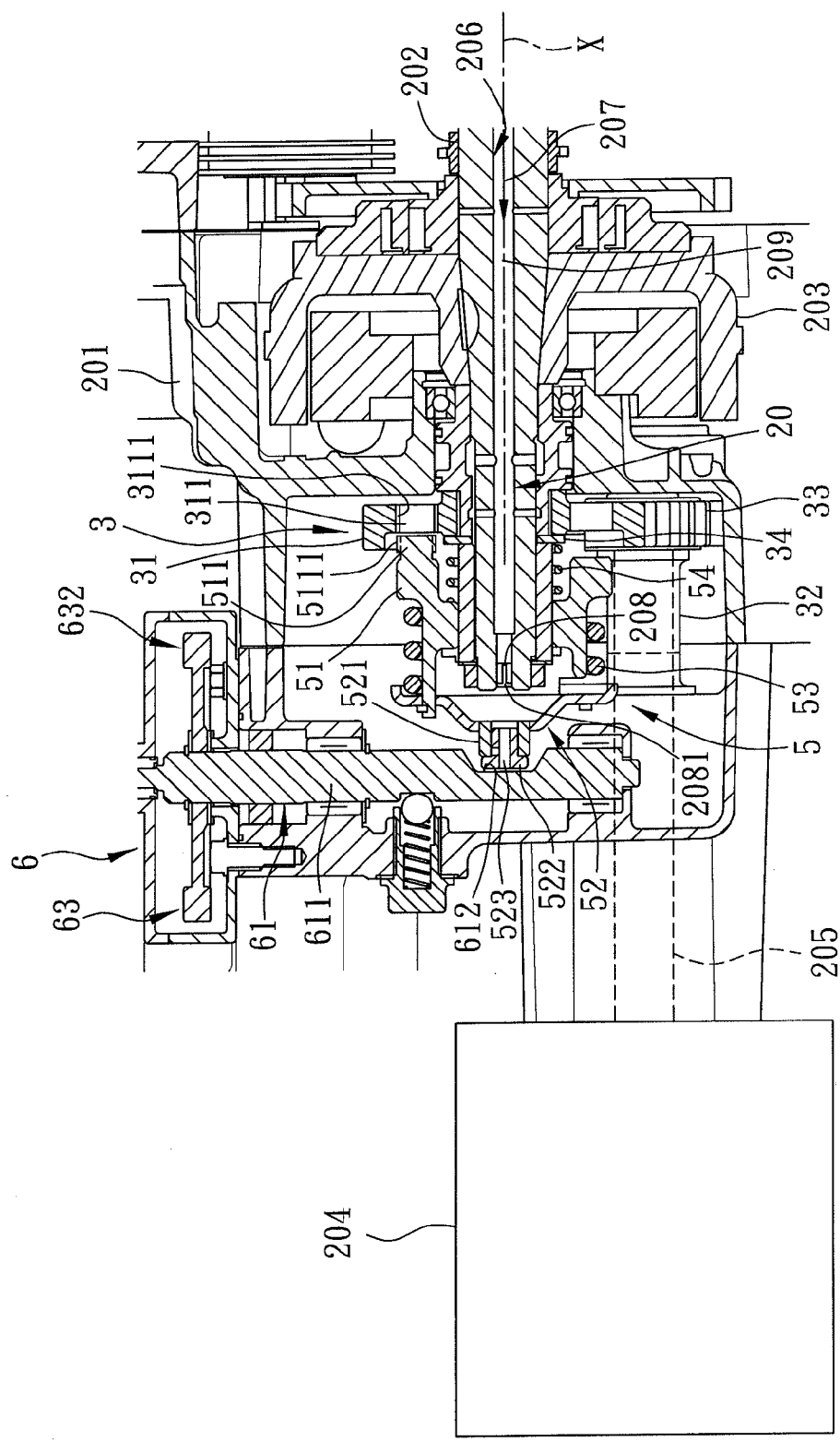
FIG. 2 is a fragmentary sectional view of the preferred embodiment of a transmission assembly for a vehicle according to the present invention, illustrating an operating state of a clutch unit, where the clutch unit is disposed at a disengaging position.
Figure 3:
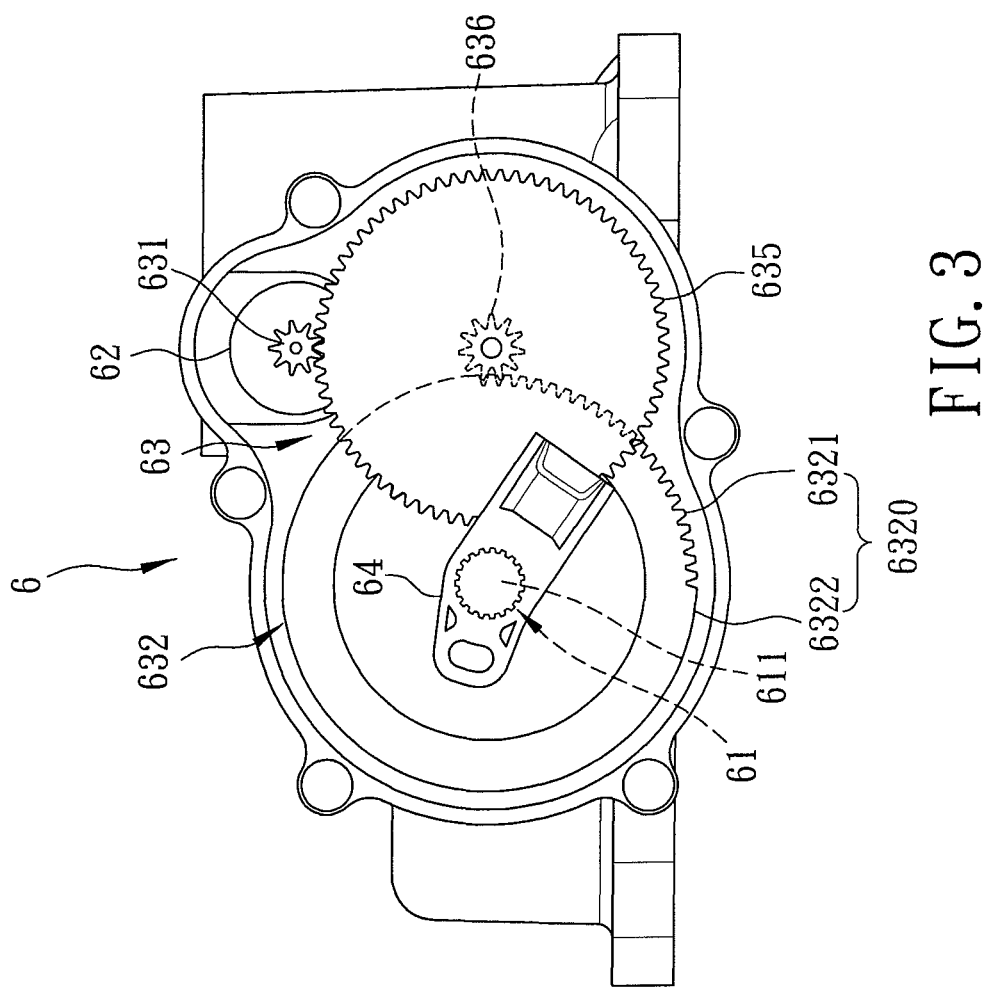
FIG. 3 is a schematic view of the preferred embodiment to illustrate a configuration of a gear set and an operating state of a clutch-driving member, where the clutch-driving member together with a position indicator is disposed at a first angular position.

The clutch unit 5 is co-rotatably coupled to the crankshaft 202, has a second inter-engaging element 511, and is slidable along the crankshaft rotation axis (X) between an engaging position (see FIG. 4) and a disengaging position (see FIG. 2). In the engaging position (see FIG. 4), the second inter-engaging element 511 of the clutch unit 5 engages the first inter-engaging element 311 of the first gear 31 in a tongue-and-groove engaging manner, so as to permit transmission of a rotational power of the crankshaft 202 to the generator shaft 205 through the first and second gears 31, 33. In the disengaging position (see FIG. 2), the second inter-engaging element 511 of the clutch unit 5 is disengaged from the first inter-engaging element 311 of the first gear 31.

The electric driven switching mechanism 6 includes a clutch-driving member 61, a motor 62, and a gear set 63 coupled between the motor 62 and the clutch-driving member 61. The clutch-driving member 61 is driven by the motor 62 through the gear set 63 so as to move relative to the transmission mechanism 3 and the clutch unit 5 and to drive sliding movement of the clutch unit 5 from the disengaging position to the engaging position.

In this embodiment, the clutch-driving member 61 is in the form of a shaft rod 611 that is formed with a notch 612 and that is pivoted to the support 201. The gear set 63 includes a driving gear 631 mounted to and driven by the motor 62, a first speed-reduction gear 635 meshing with the driving gear 631, a second speed-reduction gear 636 co-axially connected to the first speed-reduction gear 635 so as to be co-rotatable with the first speed-reduction gear 635, and a driven gear 632 co-axially connected to the shaft rod 611. The driven gear 632 has a peripheral end 6320 that has a circumferential toothed section 6321 which is engageable with the second speed-reduction gear 636, and a circumferential non-toothed section 6322 which is not engageable with the second speed-reduction gear 636. The shaft rod 611 is driven by the motor 62 through the gear set 63 to rotate relative to the transmission mechanism 3 and the clutch unit 5 between first and second angular positions (see FIGS. 3 and 5). The clutch unit 5 is pushed by the clutch-driving member 61 to move along the crankshaft rotation axis (X) from the disengaging position (see FIG. 2) to the engaging position (see FIG. 4) when the clutch-driving member 61 together with the position indicator 64 is moved from the first angular position (see FIG. 3) to the second angular position (see FIG. 5). The position indicator 64 is coaxially connected to the shaft rod 611 for indicating a position of the clutch unit 5 relative to the first gear 31, such that an operator can determine whether the clutch unit 5 is in the engaging position or the disengaging position by checking the position of the position indicator 64.

The annular restricting plate 34 is securely sleeved around the crankshaft 202, and is in contact with the first gear 31 to restrict axial movement of the first gear 31. The restoring urging member 54 has two ends abutting against the annular restricting plate 34 and the clutch unit 5, respectively, for restoring the clutch unit 5 to move back from the engaging position to the disengaging position.

The clutch unit 5 includes an annular slider 51, a pushing plate 52, a resilient buffering member 53, a mounting seat 521, and a driven protrusion 522. The annular slider 51 is slidably sleeved around the crankshaft 202, and is formed with the second inter-engaging element 511 so as to be engageable with the first inter-engaging element 311 of the first gear 31. One of the ends of the restoring urging member 54 abuts against the annular slider 51. The pushing plate 52 is movably mounted to an end of the annular slider 51, and is slidable relative to the annular slider 51. The resilient buffering member 53 has two ends abutting against the annular slider 51 and the pushing plate 52, respectively. The driven protrusion 522 is mounted to the pushing plate 52 through the mounting seat 521, protrudes outwardly from the pushing plate 52 toward the shaft rod 611, is disposed in the notch 612 when the shaft rod 611 is disposed at the first angular position, and is disposed outwardly of the notch 612 and abuts against the shaft rod 611 when the shaft rod 611 is disposed at the second angular position.

In this embodiment, the first inter-engaging element 311 is in the form of an engaging block formed with inner spline teeth 3111. The second inter-engaging element 511 is in the form of an engaging ring formed with outer spline teeth 5111 that engage the inner spline teeth 3111.

The lubricating unit 20 has a channel-defining wall 206 and a jet-forming inner sleeve 208. The channel-defining wall 206 is formed in the crankshaft 202, and defines a lubricant channel 209. The jet-forming inner sleeve 208 is mounted in the lubricant channel 209, and defines a constriction passage 2081 that is in fluid communication with the lubricant channel 209 and that has a cross-sectional area less than that of the lubricant channel 209 for creating a lubricant jet passing therethrough when a lubricant 207 is delivered into the lubricant channel 209. The driven protrusion 522 defines an inner passage 523 that is disposed adjacent to and that is in fluid communication with the constriction passage 2081 for passage of the lubricant jet therethrough, so that the lubricant 207 from the lubricant channel 209 can be applied to a contacting interface between the shaft rod 611 and the driven protrusion 522.

Figure 4:
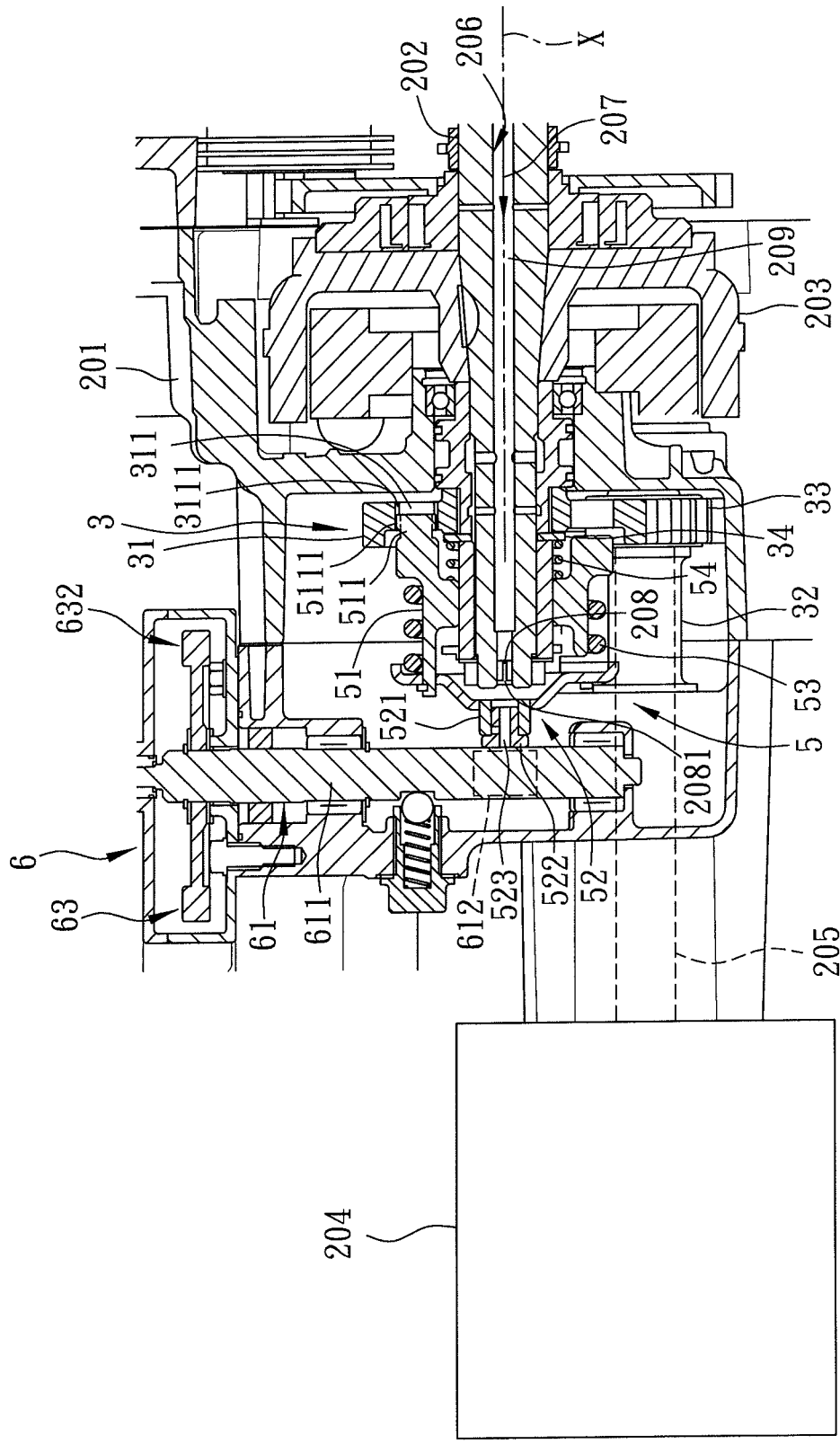
FIG. 4 is a fragmentary sectional view of the preferred embodiment to illustrate another operating state of the clutch unit, where the clutch unit is disposed at an engaging position.
Figure 5:
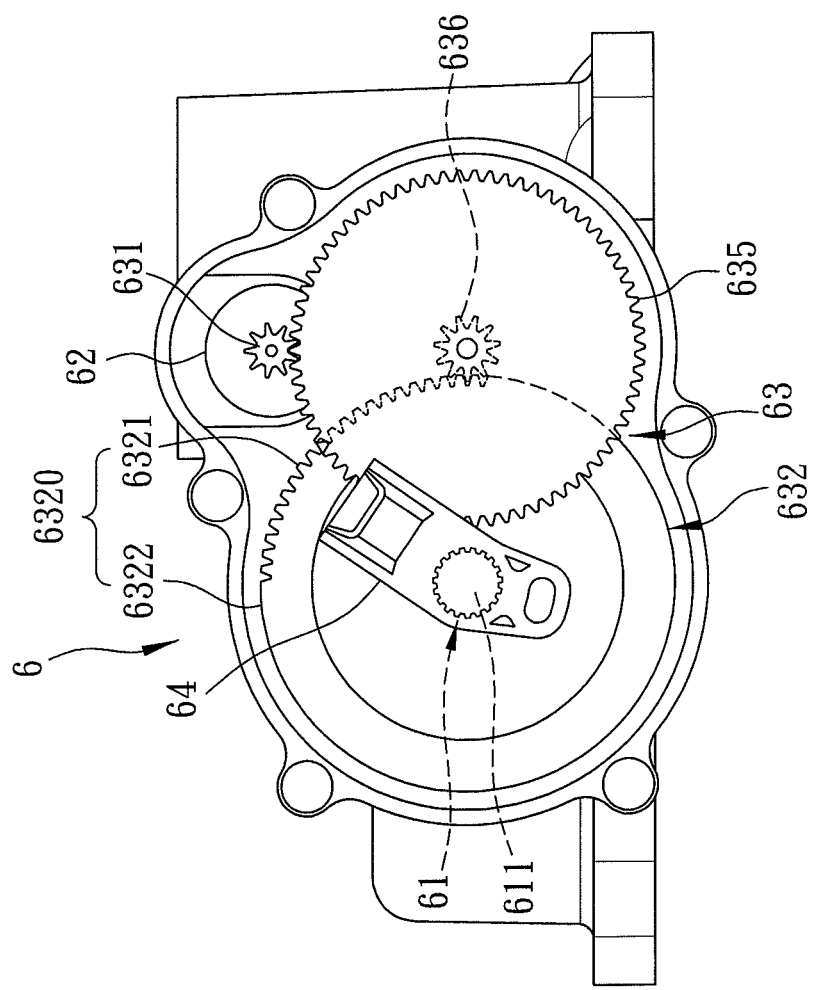
FIG. 5 is a schematic view of the preferred embodiment to illustrate another operating state of the clutch-driving member, where the clutch-driving member together with the position indicator is disposed at a second angular position.

In operation, referring to FIGS. 2 and 4, when the motor 62 is actuated to rotate the shaft rod 611 from the first angular position (see FIG. 2) to the second angular position (see FIG. 4), the driven protrusion 522 together with the pushing plate 52 of the clutch unit 5 is pushed by the shaft rod 611 so as to push the annular slider 51 through the resilient buffering member 53, the clutch unit 5 is moved from the disengaging position toward the engaging position, and the restoring urging member 54 is compressed by the annular slider 51 so as to accumulate a restoring force for restoring the clutch unit 5 back to the disengaging position. During movement of the clutch unit 5 from the disengaging position to the engaging position, the second inter-engaging element 511 is likely to first abut against the first gear 31 as a result of misalignment between the second inter-engaging element 511 and the first inter-engaging element 311, thereby resulting in a compression state of the resilient buffering member 53. Since the clutch unit 5 is constantly co-rotated with the crankshaft 202 about the crankshaft rotation axis (X), the second inter-engaging element 511 can be subsequently aligned with the first inter-engaging element 311 and brought into engagement with the first inter-engaging element 311, and is released from abutting against the first gear 31. As such, the resilient buffering member 53 can then extend from the compression state to a non-compressed state and restore the pushing plate 52 back to its original position.

With the inclusion of the electric driven switching mechanism 6 in the transmission assembly of the present invention, the aforesaid drawback associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A transmission assembly for a vehicle including a support, a crankshaft defining a crankshaft rotation axis, and a current-supplying generator with a generator shaft, said transmission assembly comprising:
    a transmission mechanism adapted to be mounted to the support, and including first and second gears, a restoring urging member and an annular restricting plate, said first gear being adapted to be coaxially sleeved around the crankshaft in a manner that the crankshaft is rotatable relative to said first gear, said second gear meshing with said first gear and being adapted to be co-rotatably coupled to the generator shaft, said annular restricting plate being adapted to be securely sleeved around the crankshaft and being in contact with said first gear for restricting axial movement of said first gear;
    a clutch unit adapted to be co-rotatably coupled to the crankshaft and slidable along the crankshaft rotation axis between an engaging position, in which said clutch unit engages said first gear so as to permit transmission of a rotational power of the crankshaft to the generator shaft through said first and second gears, and a disengaging position, in which said clutch unit is disengaged from said first gear, said restoring urging member having two ends abutting against said annular restricting plate and said clutch unit, respectively, for restoring said clutch unit to move back from the engaging position to the disengaging position; and
    a switching mechanism including a motor, a clutch-driving member that is driven by said motor to move relative to said transmission mechanism and said clutch unit and to drive sliding movement of said clutch unit from the disengaging position to the engaging position, and a gear set coupled between said motor and said clutch-driving member so that said clutch-driving member is driven to move by said motor through said gear set;
    wherein said clutch-driving member is in the form of a shaft rod that is adapted to be pivoted to the support, that is formed with a notch, and that is driven by said motor through said gear set to rotate relative to said transmission mechanism and said clutch unit between first and second angular positions;
    wherein said clutch unit includes an annular slider adapted to be slidably sleeved around the crankshaft and engageable with said first gear, one of said ends of said restoring urging member abutting against said annular slider,
    a pushing plate movably mounted to said annular slider,
    a resilient buffering member having two ends abutting against said annular slider and said pushing plate, respectively, and
    a driven protrusion protruding outwardly from said pushing plate toward said shaft rod, being disposed in said notch when said shaft rod is disposed at the first angular position, and being disposed outwardly of said notch and abutting against said shaft rod when said shaft rod is disposed at the second angular position.

2. The transmission assembly of claim 1,
    wherein said gear set includes a driving gear mounted to and driven by said motor, a first speed-reduction gear meshing with said driving gear, a second speed-reduction gear co-axially connected to said first speed-reduction gear so as to be co-rotatable with said first speed-reduction gear, and a driven gear co-axially connected to said shaft rod,
    wherein said driven gear has a peripheral end that has a circumferential toothed section which is engageable with said second speed-reduction gear, and a circumferential non-toothed section which is not engageable with said second speed-reduction gear,
    wherein said clutch unit is pushed by said clutch-driving member to move from the disengaging position to the engaging position when said clutch-driving member is moved from the first angular position to the second angular position.

3. The transmission assembly of claim 1, wherein said first gear is formed with a first inter-engaging element, and said annular slider is formed with a second inter-engaging element that engages said first inter-engaging element in a tongue-and-groove engaging manner when said clutch unit is disposed at the engaging position and that is disengaged from said first inter-engaging element when said clutch unit is disposed at the disengaging position.

4. The transmission assembly of claim 3, wherein said first inter-engaging element is in the form of an engaging ring with inner spline teeth, and said second inter-engaging element is in the form of an engaging block with outer spline teeth that engage said inner spline teeth.

5. The transmission assembly of claim 2, further comprising a position indicator that is connected to said shaft rod for indicating a position of said clutch unit relative to said first gear.

6. The transmission assembly of claim 1, further comprising a lubricating unit that has a channel-defining wall and a jet-forming inner sleeve, said channel-defining wall being adapted to be formed in the crankshaft and defining a lubricant channel, said jet-forming inner sleeve being mounted in said lubricant channel and defining a constriction passage that is in fluid communication with said lubricant channel and that has a cross-sectional area less than that of said lubricant channel for creating a lubricant jet therethrough when a lubricant is delivered into said lubricant channel, said driven protrusion defining an inner passage that is disposed adjacent to and that is in fluid communication with said constriction passage for passage of the lubricant jet therethrough.

* * * * *